United States Patent [19]

Mistry

[11] Patent Number: 4,494,142
[45] Date of Patent: Jan. 15, 1985

[54] METHOD OF AND APPARATUS FOR SCRAMBLED TELEVISION PROGRAM ADDRESSABLE SUBSCRIPTION SELECTION AND DECODING

[75] Inventor: Kantilal Mistry, Freehold, N.J.

[73] Assignee: Blonder-Tongue Laboratories, Inc., Old Bridge, N.J.

[21] Appl. No.: 323,280

[22] Filed: Nov. 20, 1981

[51] Int. Cl.³ .................. H04N 7/16; H04K 1/02; H04K 1/04
[52] U.S. Cl. .................. 358/118; 358/114; 358/122
[58] Field of Search ............ 358/114, 117, 121, 122, 358/123, 118

[56] References Cited

U.S. PATENT DOCUMENTS

| | | | |
|---|---|---|---|
| 3,777,053 | 12/1973 | Wittig et al. | 358/117 |
| 3,813,482 | 5/1974 | Blonder | 178/5.1 |
| 4,095,258 | 6/1978 | Sperber | 358/120 |
| 4,112,464 | 9/1978 | Guif et al. | 358/122 |
| 4,115,807 | 9/1978 | Pires | 358/122 |
| 4,163,252 | 7/1979 | Mistry et al. | 358/118 |
| 4,245,245 | 1/1981 | Matsumoto | 358/121 |
| 4,348,691 | 9/1982 | Mistry | 358/114 |
| 4,430,669 | 2/1984 | Cheung | 358/122 |

OTHER PUBLICATIONS

Delta Benco Cascade Ltd. bulletin "Remote Control in CATV Systems", E. W. Chisholm.

Primary Examiner—S. C. Buczinski
Attorney, Agent, or Firm—Rines, Rines, Shapiro and Shapiro

[57] ABSTRACT

This disclosure is concerned with an improved special program addressable subscription decoding technique in accordance with which ordinary program subscribing decoders continue to receive and decode the scrambled flat rate programs to which they are entitled while being disabled from receiving any of a plurality of special scrambled programs associated with a different control signal that will only enable decoding after preset unique address verification has been transmitted, checked and introduced into memory indicative of subscription to particular of such special programs, whereby the special program decoding will be effected compatibly with the continued flat rate program decoding by ordinary program subscribers.

22 Claims, 6 Drawing Figures

FIG. I.

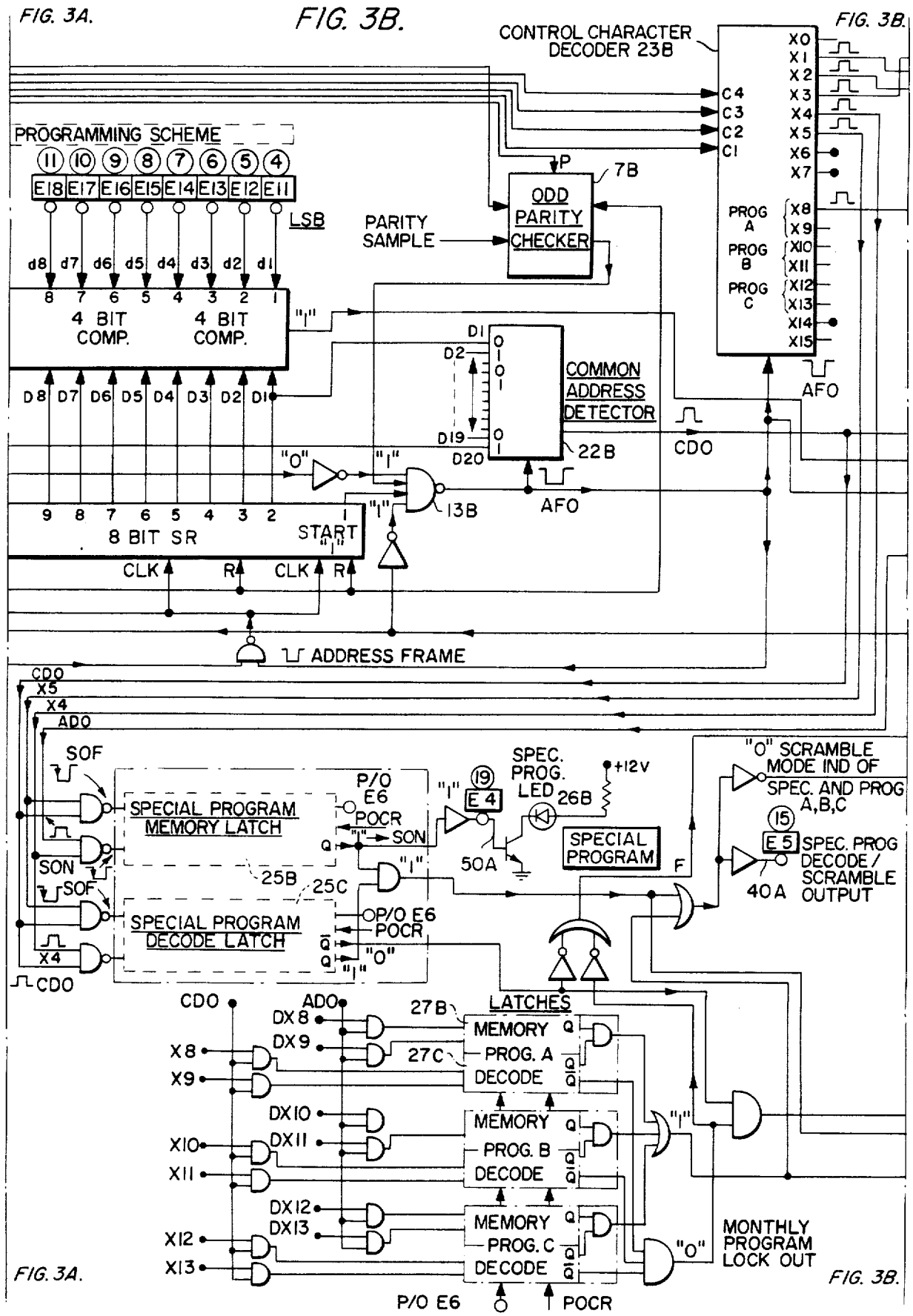

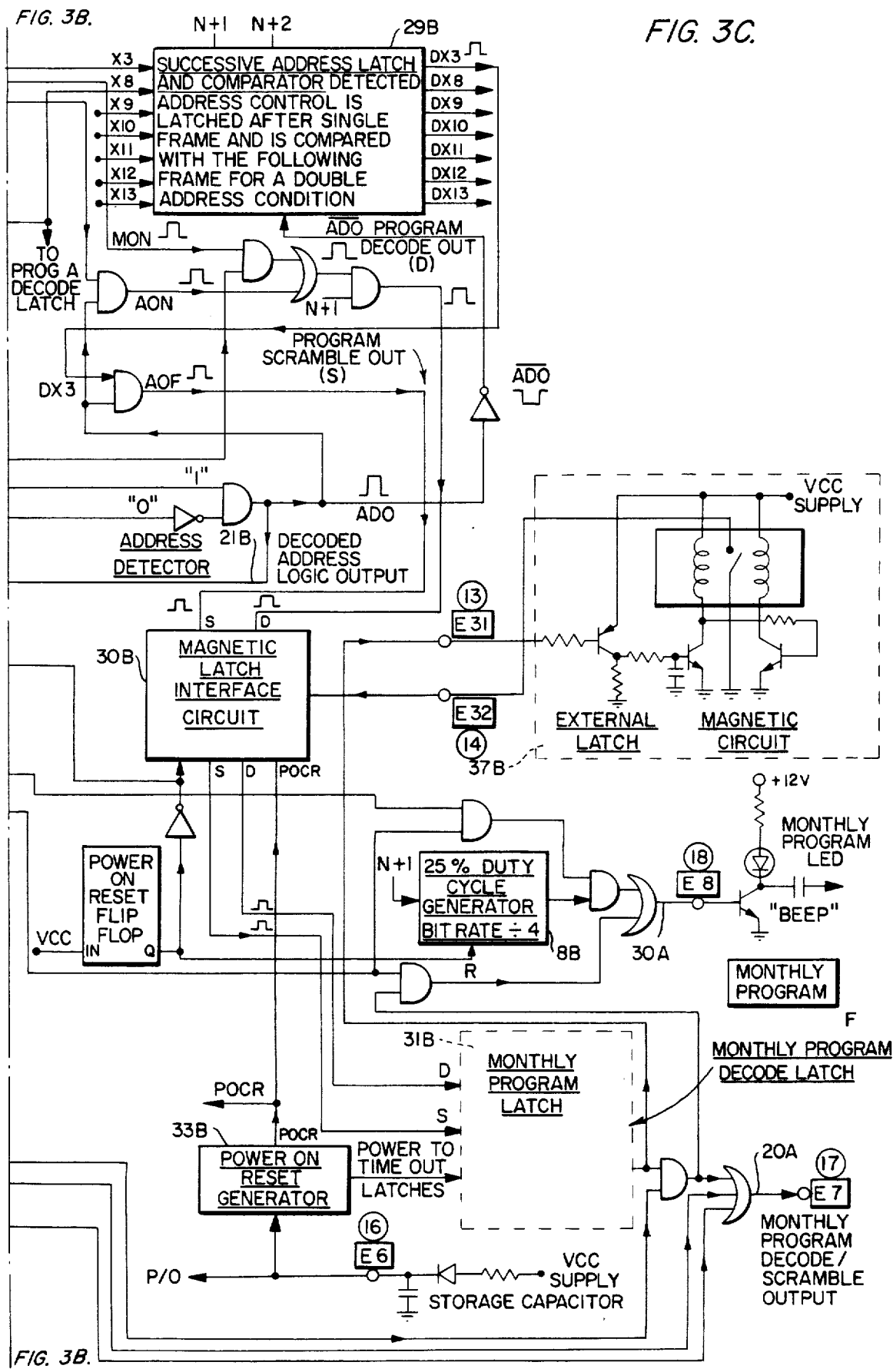

METHOD OF AND APPARATUS FOR SCRAMBLED TELEVISION PROGRAM ADDRESSABLE SUBSCRIPTION SELECTION AND DECODING

The present invention relates to methods of and apparatus for scrambled television transmission and reception, being more particularly directed to addressable multi-special program decoding subscription techniques operable compatibly with ordinary program subscription decoding at receivers that have not subscribed to the special programming.

Techniques for addressing special program subscribers in cable television and other similar subscription systems have long been employed as described, for example, in Delta Benco Cascade Ltd. bulletin "Remote Control In CATV Systems", E. W. Chisholm. Among the limitations of such systems are their lack of ready adaptability for flexible addressable special program decoding compatibly with ordinary program subscription decoding. As another example, applied to over-the-air subscription television (STV), reference may be made to U.S. Pat. No. 4,112,464. Serious limitations to such an approach, however, include the requirements for continual addressing transmissions and verifications, among other disadvantages.

Among the objects of the present invention are the obviating of such limitations and others through providing a new and improved method of and apparatus for addressable multi-special scrambled program subscription transmission and decoding that enables verified addressed decoders to decode such special programs while preventing the decoders of ordinary scrambled program subscribers (so-called flat rate subscribers) from decoding the same, though without interfering with the decoding of such ordinary program transmissions, and without requiring continual addressing transmissions or verifications.

While not exclusively applicable to such, moreover, the invention is preferred for use with scrambling techniques that do not alter the picture signal, such as those described in U.S. Pat. Nos. 3,813,482; 4,095,258; and 4,163,252; and the addressable techniques of the invention are designed so as not to interfere with the inherent high quality picture reproduction advantages of such scrambling techniques.

Another object is to provide such a novel method and apparatus that provide for a wide variety of program choices, and additionally provide the flexibility for late subscribers to join the special program subscription, all without impairing or interfering with simultaneous ordinary and special program decoding by others.

Still another object is to provide a novel scrambled program addressable technique of more general utility as well; other and further objects being explained hereinafter and being more particularly delineated in the appended claims.

In summary, however, from one of its important aspects, the invention embraces a method of subscription scrambled television decoding of ordinary scrambled programs transmitted with pilot-tone-controlled control signal and of special subscription scrambled special programs transmitted with different control signal, that comprises, receiving the scrambled ordinary programs and decoding the same in response to said pilot-tone-controlled signal; locking out the unsubscribed decoding of special scrambled programs upon receiving said different control signal, but with continued decoding of the ordinary scrambled programs; detecting transmitted unique address information for a special program subscribing receiver; checking the address information to insure its correctness; and thereupon pre-setting in memory an over-ride of said different control signal to enable the receiving-decoding of said special programs when transmitted and received. Preferred details and best mode implimentation are later set forth.

The invention will now be described with reference to the accompanying drawings, FIG. 1 of which is a block diagram of a preferred addressable decoder system constructed in accordance with the invention;

FIGS. 3A–3C are a detailed circuit diagram of the preferred form of such address decoder portion.

Figure 1:
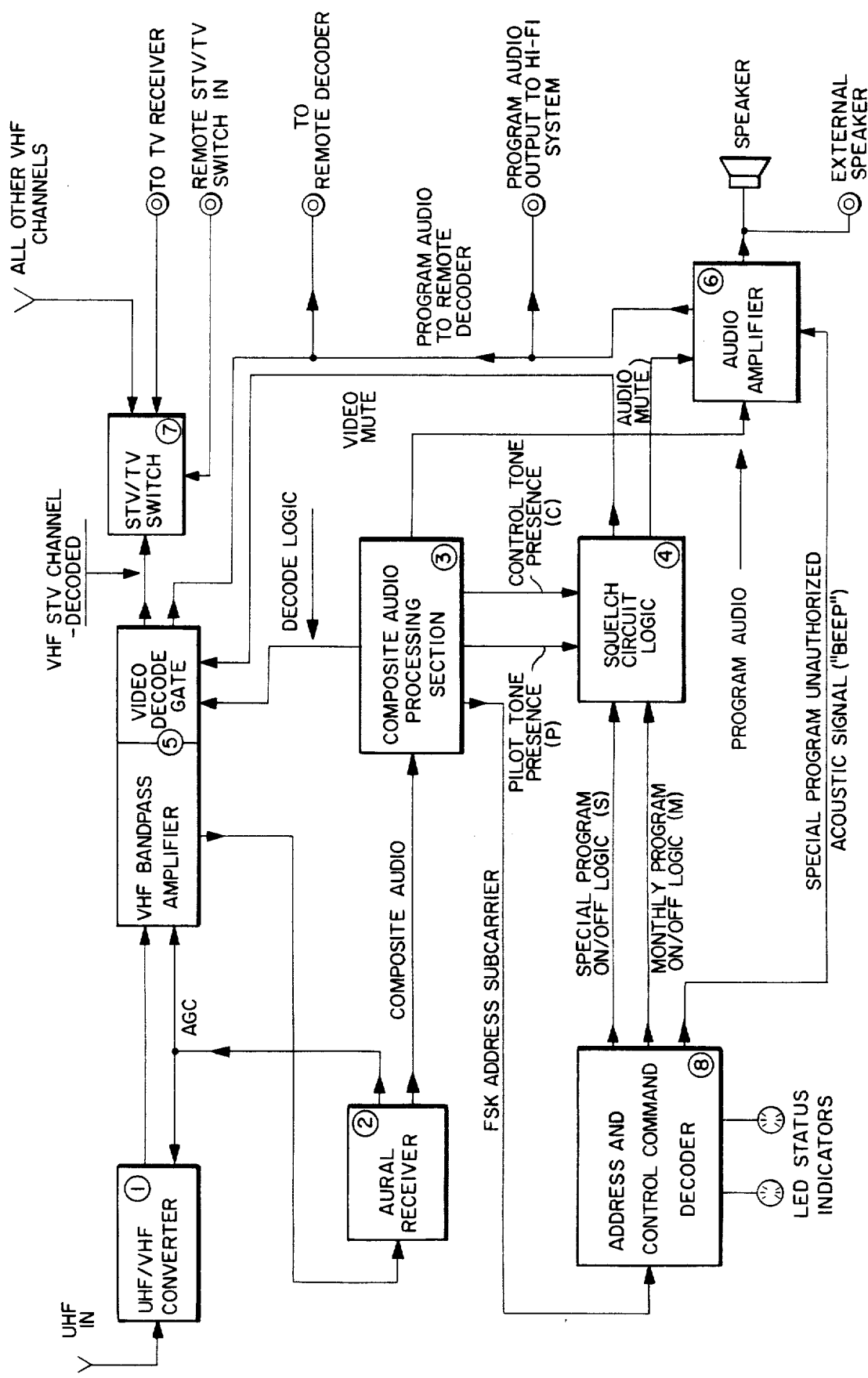

Referring to FIG. 1, an addressable decoder system for processing scrambled television signals transmitted over-the-air is illustrated, performing the main functions of:

1. receiving an encoded TV signal transmitted in, for example, the UHF band and converting it to one of the VHF channel unused in the area (such as channel 3, as an illustration);
2. decoding an encoded video and program audio signal;
3. selectively responding to the TV station commands by recognition of the device's pre-assigned unique address; and
4. responding to the "common" commands addressed to all the viewers at the same time.

The decoder of the invention contains a high quality (low noise, high stability) crystal controlled single channel UHF-to-VHF down converter 1, receiving UHF signals from a dedicated antenna and converting them into one of the low-band VHF TV channels, such as the before-mentioned channel 3. A high sensitivity and low noise figure of the converter ensures proper reception in remote areas and conventional AGC (so-labelled) guarantees an extremely wide dynamic range. The converter 1 feeds the VHF bandpass amplifier input of the later-described video decoding circuit 5 and from such amplifier applies RF signal to an aural receiver 2. The aural receiver 2 derives an FM-modulated aural carrier from the VHF channel spectrum, demodulates it, and delivers a composite audio baseband for further processing at 3. The composite audio contains the following signals: a voice-grade barker audio (say, 50 Hz–5 KHz); a sinusoidal frequency and phase reference pilot tone; a sinusoidal control tone, a USB (Upper Side Band) Program Channel modulated with full-range (50 Hz to 15 KHz) program audio and an FSK (Frequency Shift Keying) channel of address and control commands data. The aural receiver 2 also delivers back an AGC voltage to the UHF/VHF converter 1 and the said VHF bandpass amplifier. By deriving the AGC voltage from the aural and not the visual carrier, this system insures that the AGC is independent of the TV signal transmission (STV-encoded or TV-free) mode.

As before mentioned, the composite audio baseband is processed in composite audio processing section 3, performing the following functions:

a. filters out unwanted barker channel signal;
b. separates pilot tone and control tone from the composite baseband;
c. performs a demodulation of the USB-SC program audio channel and delivers the demodulated program audio to the later-described audio amplifier 6;
d. provides decode logic signal to video decoding section 5;
e. provides an FSK address/control command data subcarrier channel to address the later-described decoder section 8; and
f. detects the presence/absence of the control and pilot tones and converts it into corresponding disabling/enabling logic signals.

The last-named functions are detected and fed to a squelch logic circuit section 4 that combines the enable/disable logic signals from the following sources:
control tone detector (indicating presence of absence of the tone);
pilot tone presence/absence detector; and
address decoder section 8: Special Programs (including group programs) ON/OFF, and ordinary Monthly Program ON/OFF logic.

The result of the above combination is used for enabling/disabling (mute) the previously mentioned video decode sections 5 and a program amplifier 6. The use of the above signals and their influence on muting functions will now be outlined.

Considering, first, the non-scrambled (free) mode of transmission, the absence of the Pilot Tone (P) and presence of the Control Tone (C) activates muting circuits, regardless of the states of the Special Program ON/OFF logic (S) or the ordinary monthly program ON/OFF logic (M), FIG. 1. The decoder does not decode and a regular TV signal is passed on the TV receiver (upper right in FIG. 1).

With the ordinary STV mode (scrambled) monthly or flat rate program, however, the Pilot Tone (P) and Monthly Program (M) lines are active, and the muting circuit is disabled and the decoder decodes. The Special Program (S) and Control Tone (C) lines are inactive. Should the decoder not have been authorized for the Monthly Program, on the other hand, the line (M) would stay inactive and the decoder would not decode.

Turning, now, to STV mode (scrambled) and to Special Programs, which may also include one of a plurality of special group programs being transmitted, consider the case where the decoder is authorized (i.e. the subscriber has subscribed) for such transmission. Three steps occur:
step 1. the Pilot Tone (P) and Monthly Program (M) lines are active, disabling muting; and
step 2. the Control Tone line (C) is active, also, cancelling lines (P) and (M) and activating the muting circuit; and,
step 3. the Special Program line (S) cancels the Control Tone action, so that the muting circuit is disabled and the decoder decodes.

Had the decoder not been authorized for the Special Program, the line (S) would have been inactive and only steps 1 and 2 would have applied. The decoder would not have decoded. It should be noted that all ordinary scrambled program subscribers—so-called Flat Rate decoders (i.e. decoders without an address decoder as in module 8 and not responding to any addressing)—will cease their operation once a Special (including Group) Program is broadcasted. This is due to a presence of the differenct Control Tone, which always accompanies the Special (or Group) Programs. This is the very reason for the transmission of the Control Tone, locking out the decoder unless overridden by presence of the SPECIAL PROGRAM ON signal (S). This feature allows both types of the decoders—Flat Rate and Addressable ones—to be used in the same area at the same time, and still inhibit an unauthorized or non-subscribing viewer (Flat Rate) from receiving the Special, including Group Programs, to which the viewer has not subscribed.

It is now in order to discuss more of the details of the video signal decode block 5. The function of this block is primarily the decoding of scrambled TV visual intelligence. This is achieved by means of dynamic change of an attenuation factor of RF gate as described in said Letters Patents.

The frequency, duration and phase of gating pulses corresponds, for example, to the horizontal scanning rate of the transmitted signal. This information is obtained from the reference pilot tone derived from the composite audio processing section 3 as explained in said Letters Patent. The decoded RF video signal (including also regular audio subcarrier, such as +4.5 MHz) is then fed to STV/TV switch section 7 and to the output jack for a TV set, as indicated to the right in FIG. 1. The VHF bandpass amplifier in the front of the video decode gate 5 provides, also, the RF signal to the aural receiver 2, as previously explained. A video mute logic signal from the squelch circuit section 4 will disable the RF gate for an uncoded (free) mode of transmission.

The audio amplifier section 6 accepts a demodulated program audio signal from the processing section 3, amplifies it and provides necessary power to the loudspeaker, so-labelled. An audio mute logic signal from the squelch logic circuit 4 will disable the entire block when an uncoded (free) signal is being transmitted. In addition, a low-level audio signal is shown provided to the external jack for a "Hi-Fi" equipment and also to the Remote Decoder (combined with the decoded VHF signal on, for example, the same coaxial cable).

The STV/TV Switch shown at 7 in the upper right-hand corner of FIG. 1, is an electronic RF diode switch which selects either the decoded VHF channel from the RF video decode gate 5, or from an external VHF antenna (full VHF band), and passes the same to the TV set. The switch can be controlled either by a front panel mounted selector or remotely (hand-wired or wireless).

In accordance with a feature of the invention, the ordinary scrambled Flat Rate program decoder can be equipped with an Address and Control Command, self-contained, plug-in decoder module 8, FIG. 1. The details of this are illustrated in the block diagram of FIG. 2, performing the following functions. First, the module 8 derives a composite baseband audio signal from section 3, FIG. 1, and filters out a binary data subcarrier channel by means of 51 KHz HPF and 62.9 KHz trap. This subcarrier is then amplified to the value required by a FSK demodulator, so-labelled, which demodulates the FSK signal (fo=55 KHz, $\Delta f=2.5$ KHz, for example) in a PLL type demodulator and provides recovered binary data to a voltage comparator. The voltage comparator corrects the duty cycle and ensures required amplitude and shape of the logic signal. A squelch circuit is shown for disabling the voltage comparator output in the absence of the FSK subcarrier or data.

The voltage comparator output feeds the LSI (Large Scale Integration) Address Decoder and associated circuits to perform the address and control commands, recognition and decoding, storage and/or execution. A detailed functional and operational description is provided in the circuit of FIGS. 3A–C, as is later explained. The programming (Read Only Memory—ROM) is schematically shown effected by appropriate jumper connections, for example, of leads $d_1$ through $d_{20}$, and the output leads 20A, 30A, and 40A and 50A are respectively shown connected by a buffer to the ordinary Monthly Program output, through a driver to the Monthly Program indicator (shown as an LED), by a further buffer to the Special Program output, and through a further driver to a Special Program LED indicator and a buffer-controlled audio indicator "Beep" tone indicator, all so-labelled in FIG. 2.

Figure 4:
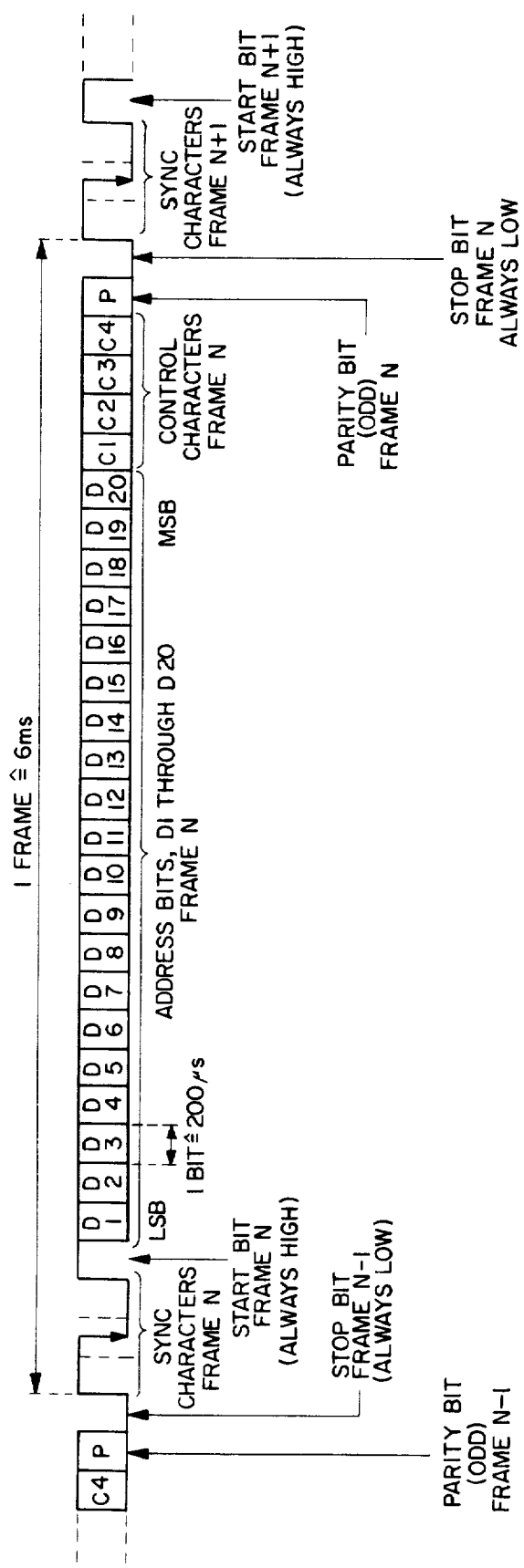
FIG. 4 is a timing diagram of a sample data frame used in the addressing system.

The preferred binary data format and protocol for the invention is shown in FIG. 4, involving a frame synchronous mode with the following parameters:

| Bit rate | 5 kilobits/sec., (1 bit = 200 $\mu$s) |
|---|---|
| Character length ($D_1$-$D_{20}$ + $C_1$ -$C_4$) | 24 bits + parity bit |
| Parity $(P)$ | Odd |
| Start bit | One (logic '1') |
| Stop bit | One (logic '0') |
| Sync bit ("Sync characters") | 1¼ times bit high + 1¼ times bit low. |

An address cycle contains thus 30 bits, using non-return-to zero pulses and occupying 6 ms of a transmission time. The address portion of the frame utilizes bits D1 through D20, allowing for over 1 million unique combinations (addresses). A control character portion occupies bits C1 through C4, involving combinations of the same that provide for 16 unique combinations. These combinations, and corresponding commands, are listed in the following table:

| TABLE OF CONTROL CHARACTERS | | | | | | |
|---|---|---|---|---|---|---|
| LOGIC INPUT | | | | OUT- | | |
| C4 | C3 | C2 | C1 | PUT | NAME | |
| 0 | 0 | 0 | 0 | X0 | DO NOT USE | |
| 0 | 0 | 0 | 1 | X1 | MASTER ON | (MON) |
| 0 | 0 | 1 | 0 | X2 | ADDRESS ON | (AON) |
| 0 | 0 | 1 | 1 | X3 | ADDRESS OFF | (AOF) |
| 0 | 1 | 0 | 0 | X4 | SPECIAL PROGRAM ON | (SON) |
| 0 | 1 | 0 | 1 | X5 | SPECIAL PROGRAM OFF | (SOF) |
| 0 | 1 | 1 | 0 | X6 | — | |
| 0 | 1 | 1 | 1 | X7 | — | |
| 1 | 0 | 0 | 0 | X8 | PROG: A ON | (PAN) |
| 1 | 0 | 0 | 1 | X9 | PROG: A OFF | (PAF) |
| 1 | 0 | 1 | 0 | X10 | PROG: B ON | (PBN) |
| 1 | 0 | 1 | 1 | X11 | PROG: B OFF | (PBF) |
| 1 | 1 | 0 | 0 | X12 | PROG: C ON | (PCN) |
| 1 | 1 | 0 | 1 | X13 | PROG: C OFF | (PCF) |
| 1 | 1 | 1 | 0 | X14 | — | |
| 1 | 1 | 1 | 1 | X15 | DO NOT USE | |

Not all of the possible combinations are presently shown as used. As previously mentioned, the transmission time of one frame equals 6 ms, thus enabling an addressing speed of approximately 10,000 unique addresses (with commands) per minute.

Figure 2:
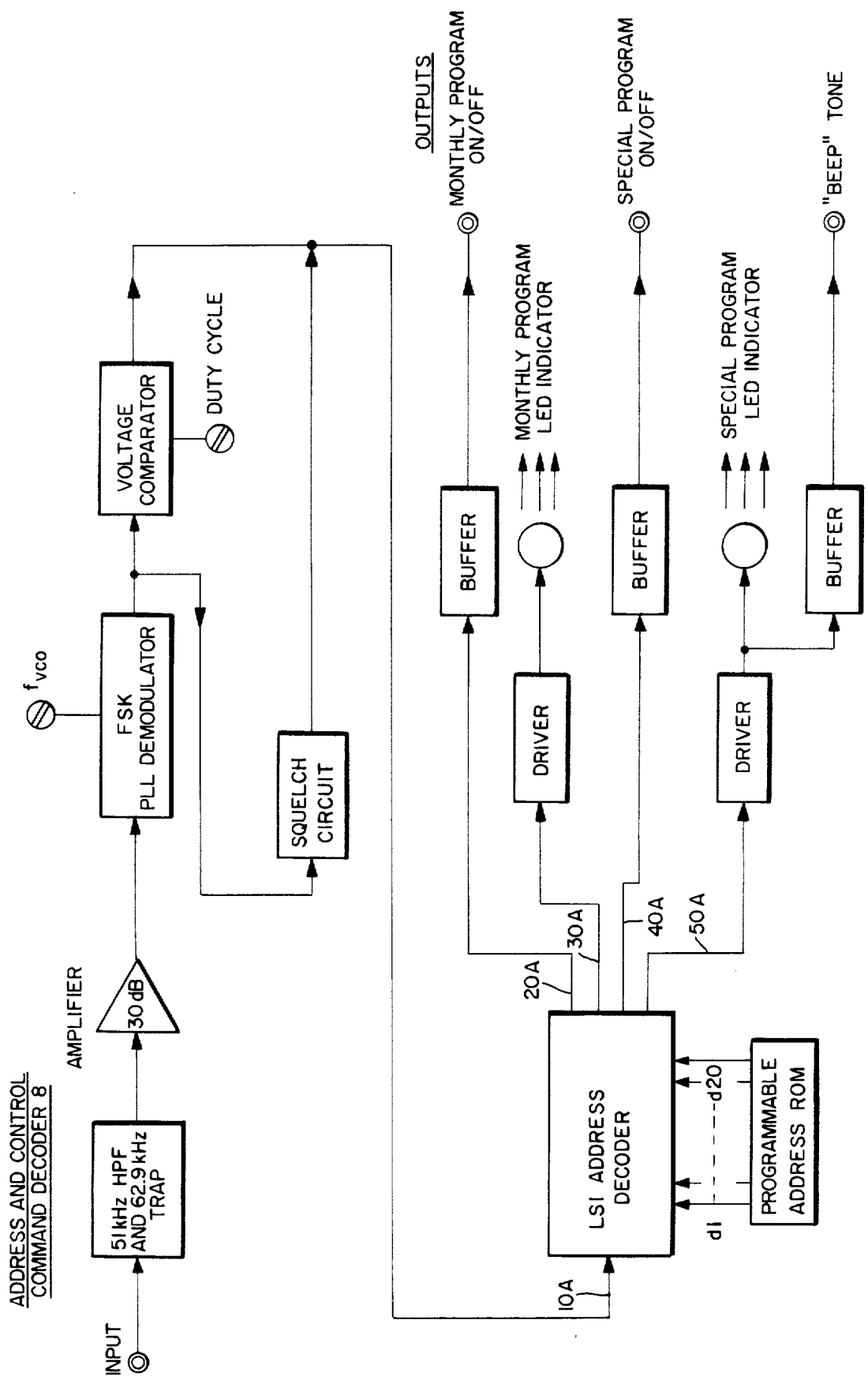
FIG. 2 is a combined block and schematic circuit diagram of the address and control command portion of the system of FIG. 1.
Figure 3A:
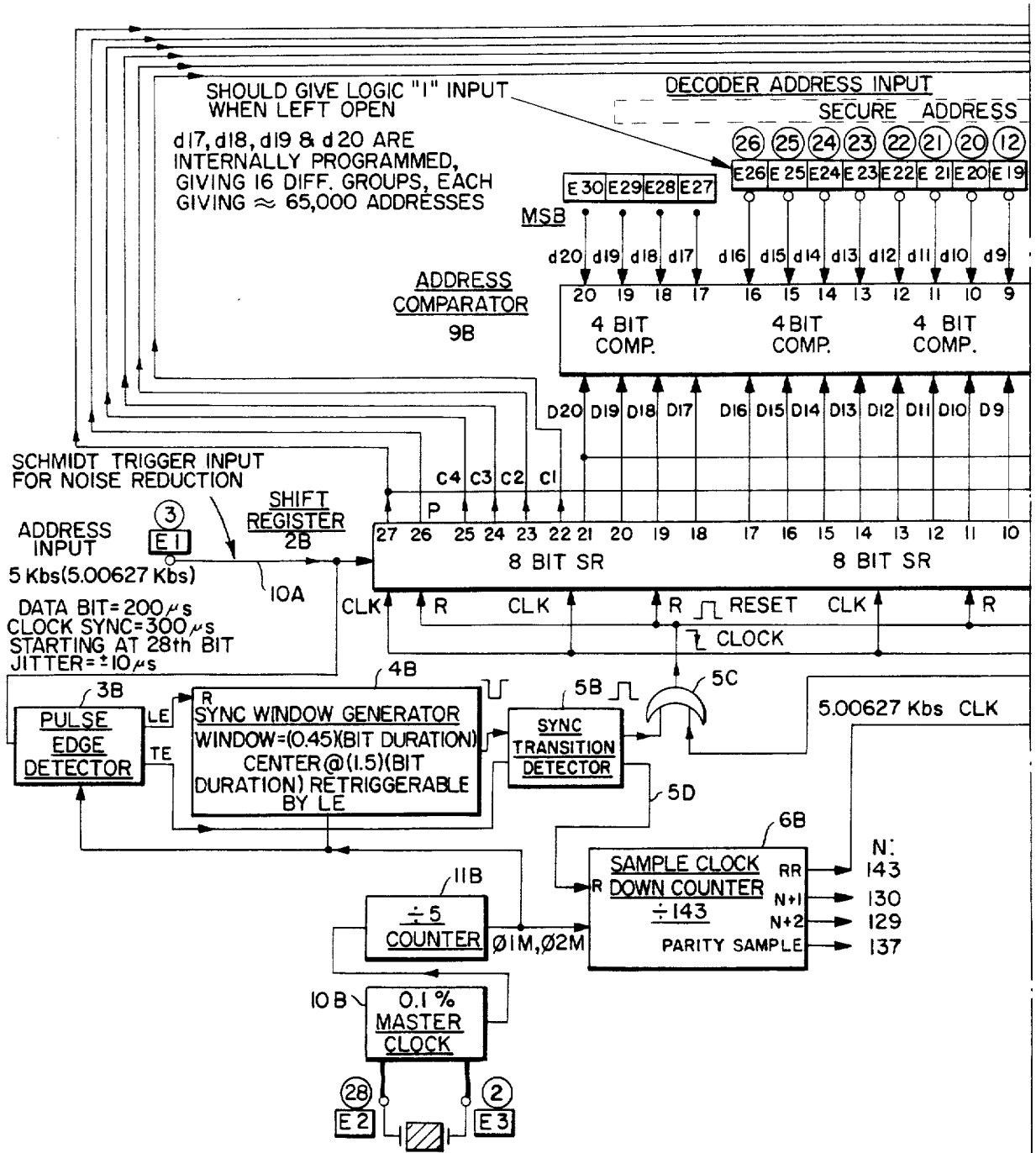

It is now in order to describe the constructional and functional details of the preferred LSI address decoder of FIG. 2, as delineated in the circuit diagram of FIGS. 3A–C. The binary data in the format shown in FIG. 4 is fed from the voltage comparator output of FIG. 2 to the input at the LSI Address Decoder, also shown as left-hand lead 10A in FIG. 3A, and from there to a serial-in, parallel-out 27 bit SHIFT REGISTER 2B, and also to a PULSE EDGE DETECTOR 3B. The PULSE EDGE DETECTOR 3B recognizes both leading and trailing edges, with the leading edge used to trigger a SYNC WINDOW GENERATOR 4B which generates a pulse of approximately 90 $\mu$s (0.45×bit duration), centered on 300 $\mu$s trailing edge (1.5×bit duration) in respect to triggering the leading edge of logic '1' portion of the sync bit. This pulse is then used to gate a SYNC TRANSITION DETECTOR 5B which senses a negative transition (trailing edge) supplied to it from the PULSE EDGE DETECTOR 3B. Should such a transition occur within the SYNC WINDOW duration, the SYNC WINDOW DETECTOR 5B provides via "or" gate 5C a RESET pulse, so-labelled, to SHIFT REGISTER 2B, and a PARITY CHECKER causing "clear" of all flip-flops; and, also, a RESET pulse via conductor 5D to a SAMPLE CLOCK DOWN COUNTER 6B, which starts generating the following:

(i) "RR" clock pulses ("CLK") repeated every 199.76 $\mu$s and lasting 1.3969 $\mu$s (=MASTER CLOCK×5), which are fed to SHIFT REGISTER 2B to cause shifting of the incoming data;

(ii) a "PARITY SAMPLE" pulse to PARITY CHECKER 7B, FIG. 3B, (toggle flip-flop); and (iii) strobe pulses "N+1" and "N+2", which are later used by an ADDRESS LATCH AND COMPARATOR 29B and by 25% DUTY CYCLE GENERATOR 8B, FIG. 3C, later fully explained.

The clock pulses to the entire system are provided by a crystal-controlled MASTER CLOCK 10B followed by a divide-by-5 COUNTER 11B. The MASTER CLOCK may, for example, utilize a crystal providing f=3.579545 MHz, giving after division, $\emptyset$1M and $\emptyset$2M (0° and 180°, respectively). The SAMPLE CLOCK DOWN COUNTER 6B, after being reset by the SYNC TRANSITION DETECTOR 5B, starts counting down from its initial state, say N=143. Its outputs may give the following:

| "RR" sample pulses | counter state N = 143 |
|---|---|
| "parity sample" | counter state N = 137 |
| "N + 1" strobe | counter state N = 130 |
| "N + 2" strobe | counter state N = 129 |

The above sequence is repeated every 143 Master Clock pulses (01M, 02M), resulting in the bit rate equal to 5.00627 kilobits/sec. The bit rate can be altered by employing different crystals.

After an entire frame has been loaded into the SHIFT REGISTER 2B, a STOP bit (always low), shown to the far left and far right in FIG. 4, and a START bit (always high), will appear in flip-flop No. 27 and No. 1 of the SHIFT REGISTER 2B. Also, the PARITY CHECKER 7B (toggle flip-flop and "0"–"1" detector) will provide logic "1" if the parity check is positive. These conditions will, in turn, produce logic "0" (AFO) at the output of the AFO gate "N AND" 13B, which will cut off the clock pulses to the SHIFT REGISTER 2B, stopping, in this way, the shifting of incoming data. Now the data present in the SHIFT REGISTER 2B is ready for decoding. The next frame will be loaded only after the next SYNC PULSE (i.e., negative transition within SYNC WINDOW) is detected, causing general RESET and repetition of the above-described procedure.

The unique address recognition is effected with the aid of each Address Decoder plug-in module 8 (FIG. 1), individually assigned a unique address which is programmed during its manufacturing process. This is done by electrical "fusing" or jumping of one or more of the 16 straps connected to, say, pins 4 through 12 and 20 through 26 of the LSI Address Decoder, forcing data lines (d1 through d16, FIG. 3) either high or low, enforcing required code. These 16 lines give $2^{16} = 65536$ different combinations. The remaining four data lines (d17 through d20) are programmed internally by means of strapping silicon chip pads (E27 through E30) inside the LSI ADDRESS DECODER. This operation provides 16 additional combinations so that the total amount of available combinations (or unique addresses) equals $16 = 65536 = 1,048,576$.

The received data, after being loaded in the SHIFT REGISTER 2B is now available for further processing. The content of flip-flops No. 2 through No. 21 is fed to 20 bit comparator 9B and compared with the pre-programmed data lines d1 through d20. A positive result of this comparison results in logic "1" at the output of the comparator, which, when combined with e,ovs/AFO/, produces an ADO (Address Detector Output) at the ADDRESS DETECTOR 21B. The presence of ADO acts as a "go ahead" for the processing of a control command accompanying the just-recognized unique address.

As for recognition of a common address, a combination of 0, 1, 0, 0 . . . for D1, D2, D3, D4 . . . respectively, has been reserved as so-called "common address", which is to be recognized by all operating decoders, irrespective of their unique addresses. This common address is used with several commands which will be explained later, and the function is performed by a COMMON ADDRESS DETECTOR 22B, FIG. 3B, which senses the 0–1–0–1 . . . train on the data lines D1 through D20 and produces a CDO (Common Address Detector Output) on its output, when enabled by e,ovs/AFO/, (i.e. when the frame has been accepted and loaded to the SHIFT REGISTER 2B). The presence of CDO acts similarly to ADO, but is used with different command signals.

After the frame has been loaded, the $\overline{AFO}$ enables CONTROL CHARACTER DECODER 23B (at top of FIG. 3B), which receives the data (C1 through C4) from corresponding portions of the SHIFT REGISTER 2B. One of the characters listed in the previously tabulated TABLE OF CONTROL CHARACTERS is being decoded and one of the corresponding lines (X0 through X15) goes high. Depending upon which line is set high, an associated algorithm is executed. An explanation of the functions of the CONTROL CHARACTERS and how they affect the Decoder is now in order.

There are basically two ways of controlling the Decoder installed in the field: a real-time addressing and a pre-programmed addressing. Real-time addressng involves the following:

MON—MASTER ON (with common address):
AON —ADDRESS ON (meaning unique); and
AOF—ADDRESS OFF (meaning unique.

Any of these commands, when transmitted with appropriate address, will cause an intermediate execution of a requested function, which is also indicated by the MONTHLY PROGRAM LED indicator fed by lines 30A in FIGS. 2 and 3C. The MON is particularly useful in providing an instant service to all customers. The customers who are not supposed to receive the service can then be selectively turned off (by using AOF) within the next minutes. The AON will ensure an instant servicing of individual requests (as over the phone). Practically, the customer will be able to watch his request being executed while still talking to the computer operator, with the data preferably being sent from a computer to the Encoder and TV transmitting in the same instant as the operator keys it into his terminal. The AOF has a counter-effect to the AON in that it simply disables the Decoder whose unique address has been sent with it. As for pre-addressing with future execution, this task is handled by the following commands:

SON—SPECIAL PROGRAM ON;
SOF—SPECIAL PROGRAM OFF;
and group programs;
PAN—GROUP PROGRAM A ON;
PAF—GROUP PROGRAM A OFF;
PBN—GROUP PROGRAM B ON;
PBF—GROUP PROGRAM B OFF;
PCN—GROUP PROGRAM C ON; and
PCF—GROUP PROGRAM C OFF.

A special Program feature is intended for broadcasting extra events (e.g., live sports, interviews, shows, etc.) which do not happen on a regular basis.

Suppose, for example, that show X has been assigned SPECIAL PROGRAM status. The customer can order it in advance and his or her request is then honored by transmitting SON with the unique address. This will set the SPECIAL PROGRAM MEMORY LATCH 25B in the Decoder and is also indicated by the SPECIAL PROGRAM LED 26B being lit, FIG. 3B. This indication ensures the viewer that his or her request has been processed promptly. The same applies to any number of other customers who decided to watch SPECIAL PROGRAM. This pre-addressing can be done at any time before the SPECIAL PROGRAM starts, and also during FREE MODE transmission and TV Studio's off-service hours. Prior to the commencement of Show X, the TV station transmits SON with common address and turns on the CONTROL TONE (23.6 KHz CW in the aural baseband). This action causes the following:

a. the Decoders which were previously pre-programmed for Show X will decode the signal and indicate their status by extinguishing MONTHLY PROGRAM LED, leaving only SPECIAL PROGRAM LED lit;

b. the not pre-programmed Decoders will not decode and also indicate their status (i.e., not authorized for this special program-Show X), keeping SPECIAL PROGRAM LED off, bringing MONTHLY PROGRAM LED to half of its normal brightness, and providing a low level, but clearly audible, continuous "beep" from the speaker. In this way, the viewer is kept well informed about the nature of the program being currently transmitted (i.e., Special Program is on, but your Decoder is not authorized to receive it. Should the non-authorized viewer wish to receive the Special Program after it has already commenced, this can be done by contacting the operator who will immediately transmit SON with particular unique address, instantaneously authorizing the Decoder.

After the Show X transmission has been completed, the TV station will transmit SOF with common address, meaning SPECIAL PROGRAM OFF, being addressed to all the Decoders in the field and turn CONTROL TONE off. This will bring all of the Decoders to their original status before the Special Program broadcast. The LED indicators will display the status, accordingly.

The construction of the LSI Address Decoder of the invention allows for further splitting the broadcasting into up to, say, three groups of certain additional special programs. (Examples: Group A—movies; Group B-13 Sports; Group C—children's programs; etc.). This feature allows a viewer to select the kind of programs which suit personal taste, and purchase it, accordingly. A programming procedure for the GROUP PROGRAMS A, B and C is, for example, as follows. In the beginning of certain time-periods (e.g., every month), the planned programs are assigned their status. This information is available to the viewers in advance, allowing them to make their choices and inform the broadcast station. These requests are then stored in the TV stations's computer memory and, once completed, are transmitted to the customers in the following format:

Viwer's choice + his unique address; i.e.,
PAN + address XX;
PCN + address XX;
PBN + address YY; etc.

This means:
Group programs A and C—for viewer XX;
Group program B—for viewer YY, etc.

The pre-programmed Decoders will store the above commands in their GROUP PROGRAM MEMORY LATCHES A, B or C, (27B). This action is not indicated by any LED on the Decoder. The pre-programming can take place at any time, both during FREE MODE and ENCODED transmissions. The proper programming is ensured by double addressing, later more fully discussed. Prior to the transmission of the special Group Program "A", the TV station turns the CONTROL TONE on to lock-out all the decoders in the field from decoding the program, and then sends PAN with common address; meaning, the Group Program "A" is now due to be decoded (command PAN) and this message is for all Decoders in the field (common address). When the Decoder receives the above, those pre-programmed for the GROUP PROGRAM "A" will decode it, indicating also correct program status by extinguishing the MONTHLY PROGRAM LED. If the Monthly Program has not been previously authorized, the MONTHLY PROGRAMED LED simply remains off. Those decoders which were not pre-programmed for the GROUP PROGRAM "A" will not decode it, indicating also current program status by dimmed MONTHLY PROGRAM LED, and a "beep" for the speaker, regardless of whether the Monthly Program has or has not been previously authorized. The status of the SPECIAL PROGRAM LED remains unchanged during any operation related to GROUP PROGRAM addressing. In general, the dim MONTHLY PROGRAM LED and a "beep" from the speaker indicates that there is a program being currently transmitted, but reception has not been authorized for it.

After the broadcasting of the GROUP PROGRAM "A" has been completed, the TV station turns the CONTROL TONE off and transmits the following:

PAF + common address, meaning: Reset GROUP PROGRAM "A" DECODE LATCH 27B (PAF) and this information is for all Decoders in the field (common address). The Decoders now assume their status as before PAN command transmission, which is indicated by corresponding LED's. The above operation does not, however, reset the GROUP PROGRAM "A" MEMORY LATCH 27B, so all those Decoders which have been initially authorized for GROUP PROGRAM "A"can be turned on instantly at any time when next GROUP PROGRAM "A" is about to be broadcasted, by a single command PAN + common address; while those non-authorized and not subscribing will not decode, as previously described. In order to cancel GROUP PROGRAM "A" authorization in the particular Decoder, the TV station has to transmit PAF + unique address. This will reset the GROUP PROGRAM "A" MEMORY LATCH 27B (in this particular decoder only), and from this moment on, the Decoder will not be able to receive a GROUP PROGRAM "A" unless authorized again. The operation is identical for GROUP PROGRAM "B" and GROUP PROGRAM "C".

In order to increase reliability of the system and protect a subscriber from being turned off accidentally (e.g., transmission error, etc.) a double addressing feature has been incorporated into the LSI Address Decoder of the invention. This requires certain commands (with their accompanying addresses) to be transmitted and received correctly twice, before the algorithm corresponding to the particular command will be executed. Suitable commands, requiring double addressing, are:

| AOF | Monthly address OFF; |
|-----|----------------------|
| PAN | Group Program A ON; |
| PAF | Group Program A OFF; and |
| PBN | |
| PBF | |
| PCN | Group Programs B and C, the same as Program A. |
| PCF | |

Monthly Program ON (AON) requires only a single address frame, and this is due to the high transmission speed required when programming customers for AON command. Master ON (MON) is usually transmitted as multiple-frame command (i.e., 10 frames) for higher reliability and hence is not included in the double addressing scheme. Special Program ON and OFF (SON and SOF) need fast addressing, also; thus single frame addressing is applied here as well. It should be noted that the double frame addressing feature has been included as a redundant security and reliability measure. The system, however, works very reliably using single frame only, even under severe multipath and low level signal conditions.

A more detailed explanation of the decoded control characters processing is now appropriate. The processing of a particular command starts after:
(a) the frame has been loaded to the SHIFT REGISTER 2B and parity checked, which results in $\overline{\text{AFO}}$;
(b) the address (either common or unique) has been recognized, giving either CDO or ADO, respectively;
(c) the command has been decoded i.e., one of the X1 through X13 outputs of the CONTROL CHARACTER DECODER 23B is in high state;
(d) in case of double addressing, the second frame has been successfully recognized, resulting in one of DX3 thru DX13 (output from the SUCCESSIVE ADDRESS LATCH AND COMPARATOR block 29B) being in high state.

Provided that all of the above conditions are met, the command will set one of the memory latches reserved to store this command. The latch can be re-set by counter command (e.g., AON→AOF) at any time after that. Suitable control character algorithms are as follows:

MASTER ON (MON). This command causes X1 to go high, and, since it is meant to affect all the customers at the same time, requires presence of the common address, which, in turn, provides CDO. These signals provide PROGRAM DECODE OUT (D) to a MAGNETIC LATCH INTERFACE CIRCUIT 30B. From there, signal D proceeds to the MONTHLY PROGRAM LATCH 31B, setting its output high. This information is now available at output lead 20A (far right in FIG. 3C, shown also as pin 17 (via AND and NOR gates). At the same time, MONTHLY PROGRAM LED (driven from pin 18, conductor 30A in FIGS. 2 and 3C goes ON, indicating that a reception of the monthly program is now authorized. ADDRESS ON (AON): When AON is decoded, X2 goes high. This command is addressed to a particular viewer, with ADO (a unique address presence) required with it. Both AON and ADO cause setting of MONTHLY PROGRAM DECODE LATCH 31B (pin 17 high). Since the unique address has been used here, and only one viewer is affected, the AON provides means for selective "turn on" of Monthly Program. The MONTHLY PROGRAM LED goes on, indicating Monthly Program authorization. ADDRESS OFF (AOF): This command refers to selective "turn-off" and as such will require a unique address to accompany it. Double addressing is also needed for higher reliability. When AOF is decoded, X3 goes high and along with $\overline{ADO}$ is stored in the SUCCESSIVE ADDRESS LATCH AND COMPARATOR 29B. As soon as the next frame is received and the next AOF decoded, the second combination of X3 $\overline{ADO}$ is compared to that stored in the SUCCESSIVE ADDRESS LATCH 29B. If the result of comparison is positive, DX3 goes high and together with $\overline{ADO}$ (DX3-$\overline{ADO}$) resets MONTHLY PROGRAM LATCH 31B. This, in turn, causes MONTHLY PROGRAME DECODE/SCRAMBLE OUTPUT at 30A going low and MONTHLY PROGRAMED LED, off.

SPECIAL PROGRAM ON (SON)—pre-programming: The decoding of SON forces X4 high which is then fed either to SPECIAL PROGRAM MEMORY LATCH 25B or SPECIAL PROGRAM DECODE LATCH 25C, depending on either ADO or CDO presence. For pre-programming the SON-ADO combination is used, so that the SPECIAL PROGRAM MEMORY LATCH 25B is set. This results in pin 19 going high and SPECIAL PROGRAM LED at conductor 50A being turned on.

SPECIAL PROGRAM ON (SON)—Execution: Stored in the SPECIAL PROGRAM MEMORY LATCH 25B, command will be excuted when SON with the common address is decoded. SON-CDO will set SPECIAL PROGRAM DECODE LATCH 25C with the "Q" output there-indicated; when ANDed with the Q output of previously set SPECIAL PROGRAM MEMORY LATCH 25B provides logic 'one' to pins 15 nd 17, causing special program execution. At the same time, the "$\overline{Q}$" output of SPECIAL PROGRAM DECODE LATCH 25C will cut off the signal from the output of the MONTHLY PROGRAM DECODE LATCH turning also MONTHLY PROGRAMED LED off (at 30A). Had the SPECIAL PROGRAM MEMORY LATCH not been pre-programmed, the SPECIAL PROGRAM DECODE/SCRAMBLE output (pin 15), would have remained low (i.e., program cannot be executed), The MONTHLY PROGRAM DECODE LATCH is cut-off and the output of the 25% DUTY CYCLE GENERATOR 8B is enabled, driving MONTHLY PROGRAM LED with 25% of its normal on-current, and hence giving dim light. A 25% duty cycle square wave of f=Bit Rate:4 (1250 Hz) is also fed to the audio amplifier giving the before-described continuous "beep" signal.

SPECIAL PROGRAM OFF (SOF): The decoding of SOF brings X5 high, and since it is to be transmitted to all the Decoders, CDO will appear along with it as a result of the common address transmission. The CDO-X5 will reset both SPECIAL PROGRAM MEMORY 25B and DECODE LATCHES 25C, bringing the Address Decoder to the status it occupied before SON transmission. This will result in SPECIAL PROGRAM LED turning off, pin 15 going down, 25% DUTY CYCLE GENERATOR 8B disabling and MONTHLY PROGRAM DECODE LATCH enabling, which ultimately allows monthly program decoding again.

| GROUP PROGRAM Control Characters | |
|---|---|
| PAN ⎫<br>PBN ⎬<br>PCN ⎭ | Program A, B or C-ON |
| PAF ⎫<br>PBF ⎬<br>PCF ⎭ | Program A, B or C-OFF |

Functionally, the operation of these commands is similar to that described for SON and SOF characters, since they are also intended for the pre-programmed type of addressing. Since the PBN-PBF and PCN-PCF pairs are exactly the same as PAN-PAF, operation of the one pair only will be described as illustrative.

GROUP PROGRAM A ON (PAN)—PRE-PROGRAMMING: Decoding of this command results first in X8 going high, which is then passed to the SUCCESSIVE ADDRESS LATCH AND COMPARATOR 9B. This command is addressed to a single Decoder and hence requires ADO. After two successive X8-ADO have been successfully recognized, resulting in DX8 going high, PROGRAM "A" MEMORY LATCH 27B is set by DX8-ADO. This action is—contrary to similar operation of SPECIAL PROGRAM MEMORY LATCH—not indicated by any LED, but is also more reliable than SON due to the double-addressing feature.

GROUP PROGRAM "A" ON—Execution: The command stored in the GROUP PROGRAM MEMORY LATCH 27B will be excuted after decoding the next PAN and CDO (common address-with execution carried out in all the Decoders simultaneously). The X8-CDO combination will set GROUP PROGRAM "A" DECODE LATCH 27C, whose output Q, when ANDed with output Q at previously set GROUP PROGRAM "A" MEMORY LATCH 27B, provides logic 'one' to pin 15 and pin 17. These two, in turn, put the Decoder into DECODE mode and the TV program can now be viewed and heard. In the Decoders which were not pre-programmed for GROUP PROGRAM "A" (i.e., their PROGRAM "A" MEMORY LATCH has not been set) output $\overline{Q}$ of the GROUP PROGRAM DECODE LATCH 27C, being now low, will cut off logic "one" (if any) from MONTHLY PROGRAM DECODE LATCH and, in the absence of logic "one" from MONTHLY PROGRAM MEMORY LATCH, will result in low levels on both pins 15 and 17. This situation stops all decoding. At the same time, inverted "$\overline{Q}$" output from GROUP PROGRAM "A" DECODE LATCH 27C will enable 25% DUTY CYCLE GENERATOR 8B, giving dim light from MONTHLY PROGRAM LED and "beep" from the speaker.

GROUP PROGRAM "A" OFF (PAF)—end of broadcasting: At the end of a broadcast of the GROUP PROGRAM "A", the TV station transmits: PAF + common address. This forces X9 high, which, when ANDed with CDO will reset GROUP PROGRAM "A" DECODE LATCH 27C, bringing the Decoder to its previous status. The GROUP PROGRAM "A" MEMORY LATCH remains unaffected, allowing for reiterated execution of the GROUP PROGRAM "A".

GROUP PROGRAM "A" OFF (PAF)—Cancellation of Authorization: In order to cancel authorization for a GROUP PROGRAM "A" of the particular Decoder, the TV station must transmit the following: PAF + unique address. Since this command is addressed to one Decoder only, it requires a unique address which, in turn, creates ADO. Double addressing is also required to perform this function, so that the ADO-Dx9 finally resets GROUP PROGRAM "A" MEMORY LATCH 27B, giving logic "zero" at its Q output. From this moment on, the Decoder will be unable to decode a GROUP PROGRAM "A", unless its GROUP PROGRAM "A" MEMORY LATCH is set again.

A further important advantage of the invention resides in its power-off memory back-up features. Reliable operation of the control character processing part of the LSI Address Decoder is based on information stored in its memory cells. Should the power fall below a certain voltage level, all data stored in the memory would ordinarily be lost. In order to protect the system against such power failure, two independent back-up circuits have been implemented: one, an active protection for short time memory retention; and secondly, a passive one, for a power failure of an infinite length of time. The active protection utilizes the principle of capacitive storage, employing a high quality (low leakage) capacitor C' with its charging circuit, connected to the pin 16 and a POWER-ON RESET GENERATOR 33B. Once the supply voltage drops, a charge stored in the capacitor C' supplies all the memory latches, allowing them to remain active. Due to a very small current required to keep the memory operative and extremely low leakage of the capacitor C', the voltage at pin 16 decreases very slowly, following an exponential discharge curve. This allows the memory to retain its state for approximately 4 minutes, in this way taking care of short-time power failures. The POWER ON RESET GENERATOR 33B will provide a POCR (POWER-ON CONDITIONAL RESET) pulse to all the memory latches only if a voltage at pin 16 has fallen below, say, +5 V (which is a limit for the memory to remain operative). The memory circuits are otherwise treated as if power failure had never occured. This action insures that the memory content will not be altered by a normal power-on reset circuit. The storage capacitor C', of course can be replaced by a long-life low power battery, of a minimum voltage of about 5 V.

Long-term power failure memory back-up is based upon a non-volatile magnetic memory, using a latching relay as its elementary cell. This kind of memory is able to retain its state for an infinite period of time with no need for supply power. This kind of protection is provided for the AON/AOF commands only, which takes care of the MONTHLY PROGRAM DECODE LATCH. Information of the MONTHLY PROGRAM DECODE LATCH state is provided, via pin 13 to the magnetic latch driving circuitry 30B which sets it in corresponding position. When the power is interrupted for a time longer than the capacitive storage back-up ability, all the semiconductor memory latches become inactive and the information stored there is lost. After the power has been restored again or POR (POWER ON RESET) would clear all circuits to their zero state. The information stored in the magnetic latch, however, has been kept unaffected by the power variations and is now fed, via pin 14 and the MAGNETIC LATCH INTERFACE CIRCUIT 30B to the MONTHLY PROGRAM DECODE LATCH 37B, hence restoring its previous status. This long-term memory retention is particularly useful when the user leaves for a longer period (e.g., weekend, vacation, etc.) and decides to turn the power off for safety reasons.

While the invention has been described with reference to particular preferred decoding techniques, it is clearly applicable to a wide variety of scrambling and decoding processes, and as many of its features as may be desired can be employed without departing from the spirit and scope of the invention; further modifications as will occur to those skilled in this art being considered to fall within such scope as defined in the appended claims.

What is claimed is:

1. A method of subscription scrambled television decoding of ordinary scrambled programs transmitted with a pilot-tone-controlled control signal and of special subscription scrambled programs transmitted with a different control signal, that comprises, receiving the scrambled ordinary programs and decoding the same in response to said pilot-tone-controlled control signal; locking out the unsubscribed decoding of special scrambled programs upon receiving said different control signal, but with continued decoding of the ordinary scrambled programs; detecting transmitted unique address information for a special program subscribing receiver; checking the address information to insure its correctness; and thereupon pre-setting in a memory an over-ride of said different control signal; and, in response to said over-ride, enabling the receiving-decoding of said special programs when transmitted and received.

2. A method as claimed in claim 1 and in which infinite-time latching is effected for the subscribed ordinary scrambled programs to obviate effects of power failure.

3. A method as claimed in claim 1 and in which short-time latching is effected for the subscribed special programs.

4. A method as claimed in claim 3 and in which said short-time latching is also effected in the absence of infinite-time latching for subscribed ordinary scrambled programs.

5. A method as claimed in claim 1 and in which said special programs include a group of programs each of which is associated with a special address characteristic in the transmitted address for the subscriber thereto.

6. A method as claimed in claim 1 and in which said different control signal is of the order of 23.6 KHz.

7. A method as claimed in claim 1 and in which the address channel transmission is effected at a frequency of the order of 55 KHz.

8. A method as claimed in claim 1 and in which the said address information comprises approximately 1½ bit high and low sync bits followed by a plurality of binary address bits, a plurality of control character bits combinations of which are used for the control functions, and a terminal parity bit.

9. A method as claimed in claim 8 and in which said binary address bits are of non-return-to-zero pulses.

10. A method as claimed in claim 8 and in which 20 address bits are provided and 16 combinations of control character bits.

11. Apparatus for subscription scrambled television decoding of ordinary scrambled programs transmitted with a pilot-tone-controlled control signal and of special subscription scrambled programs transmitted with a different control signal, said apparatus having, in combination, decoder means including means for receiving the ordinary scrambled programs and for decoding the same in response to said pilot-tone-controlled control signal and including means for decoding special scrambled programs; means responsive to said different control signal for locking-out unsubscribed decoding by said decoder means of the special scrambled programs but permitting continued decoding of the ordinary scrambled programs; means for detecting unique transmitted address information for a special program and checking the same for correctness; memory means; means connected with said detecting means for pre-setting in said memory means an over-ride of said different control signal; and means responsive to said over-ride for enabling said decoder means to perform subscribed decoding of said special program when transmitted and received.

12. Apparatus as claimed in claim 11 and in which said special programs include a group of programs each of which is associated with a special address characteristic in the transmitted address for the subscriber thereto.

13. Apparatus as claimed in claim 11 and in which the said address information comprises approximately 1½ bit high and low sync bits followed by a plurality of binary address bits, a plurality of control character bits combinations of which are used for the control functions, and a terminal parity bit.

14. Apparatus as claimed in claim 13 and in which 20 address bits are provided of the non-return-to-zero pulse type, and 16 combinations of control character bits.

15. Apparatus as claimed in claim 11 and in which magnetic latching means is provided for insuring the subscribed ordinary scrambled programs to obviate effects of power failure.

16. Apparatus as claimed in claim 11 and in which short-time latching means is provided for the subscribed special program memory means.

17. Apparatus as claimed in claim 11 and in which said decoder means comprises bandpass amplifier and video decode gate means connected to a television receiver; composite audio processing means for detecting the pilot-tone and different control signals and providing program audio and an address information subcarrier; audio amplifier means connected to receive said program audio; address and control command decoder means controlled by said subcarrier and providing ordinary and special program on/off logic control signals; and squelch circuit logic means responsive to said logic control signals and to said pilot-tone and different control signals to generate a video muting output for said video decode gate means and audio muting for said audio amplifier means.

18. Apparatus as claimed in claim 17 and in which indicator means are provided connected to said address and control command decoder means to indicate ordinary and special program on/off status.

19. Apparatus as claimed in claim 18 and in which a special program unauthorized acoustic beep signal is generated by said address and control command decoder means.

20. Apparatus as claimed in claim 17 and in which said address and control command decoder means comprises demodulator means for producing signal baseband data, and address decoder means responsive to said data and provided with programmable addressing means to generate and indicate ordinary program on/off signals, such as monthly programs, and special program on/off signals.

21. Apparatus as claimed in claim 20 and in which said address decoder means comprises shift register means for receiving address input information and address comparator means connected with the shift register means for checking the correctness of the subscriber address information.

22. Apparatus as claimed in claim 21 and in which special program memory and decode latch means is provided, connected to operate following address detecting and said checking.

* * * * *